July 7, 1964 W. D. SPEAS 3,140,116
SIDE-LOADING VEHICLE
Filed Jan. 26, 1962 2 Sheets-Sheet 1
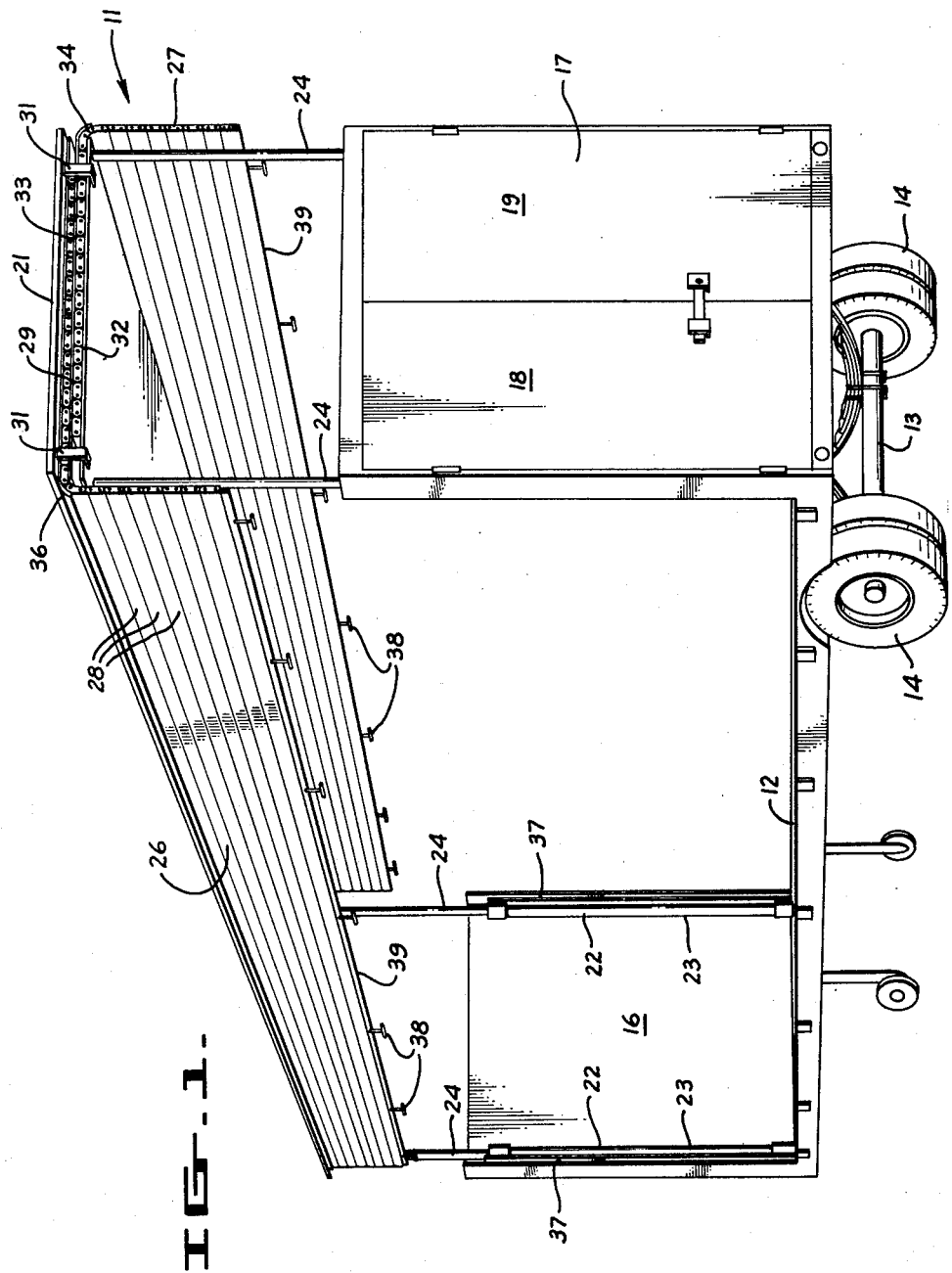
INVENTOR.
WILLIAM D. SPEAS
BY
ATTORNEYS

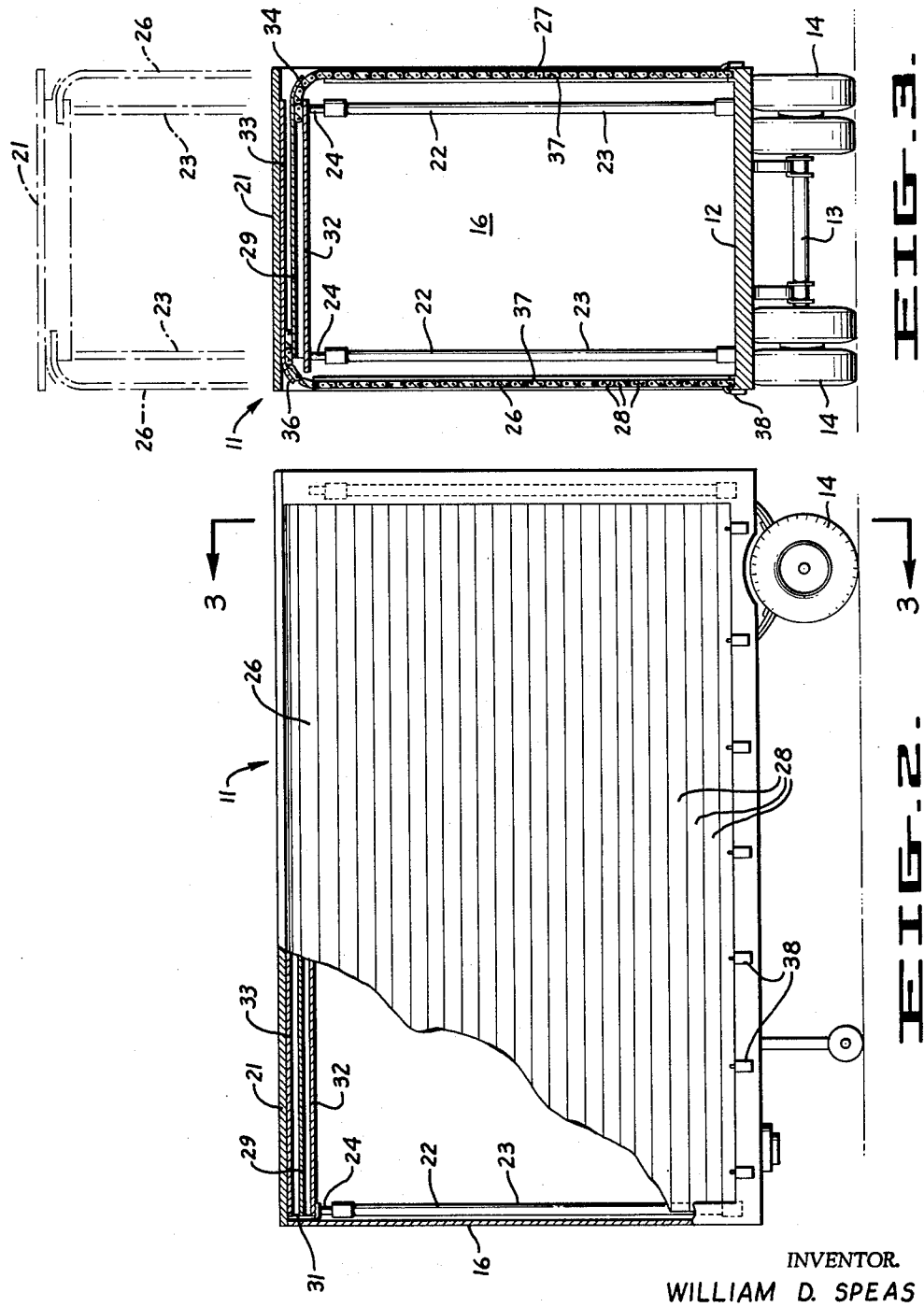

United States Patent Office 3,140,116
Patented July 7, 1964

3,140,116
SIDE-LOADING VEHICLE
William D. Speas, San Lorenzo, Calif. (49 Vista Lane, Walnut Creek, Calif.), assignor of one-half to Warren R. Langdon, San Lorenzo, Calif.
Filed Jan. 26, 1962, Ser. No. 168,969
7 Claims. (Cl. 296—100)

This invention relates generally to load carrying vehicles, such as trucks, truck-trailers, or the like, and has as a primary object the provision of an improved body construction which facilitates loading and unloading the vehicle.

Another object of the invention is to provide a load-carrying vehicle in which the side panels may be so disposed as to provide totally unobstructed side access to the vehicle's interior.

A further object is to provide a vehicle having a roof which may be raised and lowered to facilitate loading and unloading.

Still another object is to provide a vehicle wherein the roof is adjustable in elevation and the sides are adjustable in height to correspond to the disposition of the roof whereby the vehicle is adapted for variable volumetric capacity.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a perspective view of a preferred embodiment of the invention wherein the vehicle is illustrated in a fully open position.

FIGURE 2 is a side view of the vehicle illustrated in FIGURE 1, but in a closed position, and with a portion broken away.

FIGURE 3 is a cross-sectional end view taken along the plane 3—3 in FIGURE 2.

Referring now to the drawings, there is generally shown a vehicle 11 having a horizontally disposed platform 12 which is secured to an axle 13 and wheels 14 in a conventional manner. A forward wall 16 extends upwardly from one end of the platform and a rear wall 17 is secured to the rear end of the platform. If desired, the rear wall may include a pair of conventional doors 18 and 19 for loading and unloading in the usual manner when it is unnecessary to employ the features of the present invention.

Looking now at FIGURES 1 and 3, it is seen that a roof 21 is provided on the vehicle 11 and is adapted for vertical movement relative to the platform 12. More specifically, four longitudinally adjustable legs 22 extend upwardly from adjacent the four corners of the platform, and the roof is mounted on these legs. Preferably, the legs include stationary tubular bottom portions 23 with slidably mounted upper portions 24 extending upwardly therefrom. In order to raise and lower the roof without substantial manual effort it is preferred that pneumatic apparatus be used that can be coupled to a truck's compressed air supply. In this regard the upper leg portions 24 correspond to piston members slidably mounted in cylinders consisting of the tubular bottom portions 23, whereby the legs are expanded or retracted in a manner well known in relation to fluid actuated pistons and cylinders. Means of this type are disclosed in Patent No. 2,656,216, and it will be appreciated that the means for adjusting the length of the legs do not form a part of the present invention and that this function may be accomplished by various conventional devices.

It is next seen that a pair of flexible side panels 26 and 27 are secured to the roof and may be moved into a position intermediate the walls 16 and 17 and adjacent the platform 12 to form a closed vehicle body, as is best illustrated in FIGURES 2 and 3. As shown in FIGURE 1, the side panels are adapted to be raised with the roof in order to leave the sides of the vehicle completely unobstructed for loading and unloading.

In more detail now, the sides 26 and 27 are constructed as flexible panels, and are preferably made of a plurality of elongated slats 28 disposed parallel to one another with each slat being pivotally connected to adjacent slats in a generally conventional manner. By having flexible side panels these panels are readily folded into horizontal disposition beneath the roof when the vehicle is in an open position, and then may be moved into vertical disposition to close the vehicle's sides. To retain the panels beneath the roof, a first guide plate 29 is spaced below the roof and secured thereto adjacent the ends of the roof by means of brackets 31 or the like. A second guide plate 32 is then spaced below the plate 29 and also secured to the roof by means of the brackets 31. The side panel 26 is then seen to be slidable between the roof and the plate 29, and extends downwardly from one side of the roof. The other panel 27 slides between the plates 29 and 32 and extends downwardly from the other side of the roof. Preferably a third guide plate 33 is secured immediately subjacent the roof to assure a smooth sliding surface for the panel 26. Furthermore, a pair of arcuate flanges 34 and 36 preferably extend from the sides of the roof to assure that the side panels move readily upward from a vertical into horizontal position.

In order to secure the side panels in place when they are disposed intermediate the forward and rear walls, four vertical guide tracks 37 are formed along the interior of these walls respectively adjacent their edges to receive the panels. The panels are thus securely retained in a substantially planar configuration notwithstanding their flexible characteristics. In addition, a plurality of latches 38 may be provided along the bottom edges 39 of the side panels whereby they may be secured to the platform when the vehicle is closed up.

In operating the instant invention, the vehicle is opened by first disengaging the latches 38 and then manually pushing the side panels up into their horizontal positions beneath the roof. In many instances this alone will provide sufficient access to the vehicle, although the upper regions of the vehicle side will be obstructed by the bottom portions of the side panels. This latter situation is imposed because most large load carrying vehicles are much higher than they are wide. Hence the width of the roof is not sufficient to receive the full side panel. To create completely unobstructed side access as seen in FIGURE 1 it is then additionally necessary to raise the roof 21 in the manner previously set forth.

An additional feature is noted with regard to the vehicle's capability for variable volumetric capacity. More particularly, in some situations it may be desirable to leave the roof in an elevated position while in transit to accommodate slightly larger loads. Greater efficiency and capacity may thus be achieved as compared to the situation where the upper region of the truck's interior remains unoccupied because it is too small for the size objects being carried. Now, because of the construction of the side panels, the vehicle may be closed at its sides even when the roof is in an elevated position. That is, when the roof is elevated, it is necessary only to pull the panels down all the way to the platform. When the roof is in a lower position, a larger portion of the panels will remain horizontally disposed beneath the roof when the vehicle is closed.

Thus it is seen that the combined features of an adjustable roof and flexible side panels afford a novel vehicle construction whereby loading operations are greatly facilitated and capacity efficiency is increased.

What is claimed is:

1. In a vehicle of the character described having a horizontally disposed platform and two upwardly extending spaced walls respectively adjacent opposite ends of said platform, the combination comprising, a roof spaced above said platform and adapted for substantially vertical movement relative thereto, means for moving said roof, and a pair of side panels secured to said roof and adapted for disposition intermediate said spaced walls, said panels movably mounted on said roof and movable therewith for withdrawal from intermediate said spaced walls to provide unobstructed access to said vehicle through an opening adjustable in height to at least the height of said spaced walls.

2. In a vehicle of the character described having a horizontal platform and two upwardly extending spaced walls respectively adjacent opposite ends of said platform, the combination comprising, a roof spaced above said platform and adapted for substantially vertical movement relative thereto, means for moving said roof, a first flexible side panel secured to said roof and having a portion horizontally movable adjacent said roof, said panel having a bottom portion extending downwardly from said roof and movable into a position intermediate said walls and adjacent said platform, and a second flexible side panel secured to said roof and having a portion thereof horizontally movable relative to said roof, said second panel having a bottom portion extending downwardly from said roof and movable into a position intermediate said walls and adjacent said platform, both of said panels being movable with said roof and relative thereto to provide an access opening to said vehicle adjustable in height to at least the height of said spaced walls.

3. A load-carrying vehicle of the character described comprising a horizontal platform, two upwardly extending spaced walls respectively adjacent opposite ends of said platform, said walls having a greater height than width, at least one elongated longitudinally adjustable support leg secured to said platform and extending upwardly therefrom, means for varying the length of said leg, a roof secured adjacent the upper end of said leg and movable vertically therewith, and at least one flexible side panel secured to said roof and adapted for disposition intermediate said spaced walls, said panel movable with said roof and relative thereto for withdrawal from intermediate said spaced walls to provide unobstructed access to said vehicle through an opening adjustable in height to at least the height of said spaced walls.

4. A vehicle of the character described comprising a generally rectangular horizontally disposed platform, a pair of upwardly extending spaced walls respectively adjacent the ends of said platform, said walls being of greater height than width, a plurality of longitudinally adjustable support legs secured to said platform and extending upwardly therefrom, means for varying the length of said legs, a generally rectangular horizontally disposed roof secured adjacent the upper ends of said legs and adapted to move vertically therewith, a first flexible side panel secured to said roof and extending downwardly from adjacent one side thereof, a second flexible side panel secured to said roof and extending downwardly from adjacent the opposed side thereof both said panels being of greater height than width of said roof, and means secured to said roof for slidably receiving said panels for horizontal movement relative to said roof, said panels being vertically movable with said roof and relative thereto for selective disposition intermediate said spaced walls to provide access to said vehicle through an opening adjustable in height to at least the height of said spaced walls.

5. A vehicle as described in claim 4 further defined by said panels being comprised of a plurality of parallel slat members with each member being pivotally linked to each adjacent member.

6. A vehicle of the character described comprising a generally rectangular horizontally disposed platform, a pair of upwardly extending spaced walls respectively adjacent the ends of said platform with each wall having its height greater than its width, four elongated longitudinally adjustable support legs secured adjacent the respective corners of said platform and extending upwardly therefrom, means for varying the length of said legs, a generally rectangular horizontally disposed roof secured adjacent the upper ends of said legs and adapted to move vertically therewith, a first guide plate spaced below said roof and secured thereto, a second guide plate secured to said roof and spaced below said first plate, a first flexible side panel secured to said roof and adapted for horizontal movement between said roof and said first plate, said panel having its lower portion extending downwardly from adjacent one side of said roof and being vertically movable into a position intermediate said spaced walls and adjacent said platform, a second flexible side panel secured to said roof and adapted for horizontal movement between said first and second plates, said second panel having its lower portion extending downwardly from adjacent the opposed side of said roof and being vertically movable into a position intermediate said spaced walls and adjacent said platform, and four vertically disposed guide tracks secured to said spaced walls respectively adjacent the corners of said platform to receive the ends of said panels when they are moved downwardly into a position intermediate said spaced walls.

7. A load carrying vehicle of the type described comprising, in combination, a horizontally disposed load supporting platform, a pair of upwardly extending spaced walls disposed respectively adjacent opposite ends of said platform, a roof spaced above said platform and mounted thereon for substantially vertical movement relative thereto, means for moving said roof, and a pair of side panels secured to said roof and adapted for disposition intermediate said spaced walls, at least one of said panels being movably mounted on said roof and movable therewith for withdrawal from intermediate said spaced walls to provide access to said vehicle through an opening adjustable in height to at least the height of said spaced walls.

References Cited in the file of this patent

UNITED STATES PATENTS

| 2,168,069 | Miller | Aug. 1, 1939 |
| 2,170,021 | Greegor | Aug. 22, 1939 |
| 2,656,216 | Bobroff | Oct. 20, 1953 |